United States Patent Office 3,547,813
Patented Dec. 15, 1970

3,547,813
BIOCHEMICAL OXIDATION WITH
LOW SLUDGE RECYCLE
Ernest K. Robinson, Eggertsville, and John R. McWhirter, Williamsville, N.Y., assignors to Union Carbide Corporation, New York, N.Y., a corporation of New York
Filed July 2, 1969, Ser. No. 838,498
Int. Cl. C02c 1/10, 1/12
U.S. Cl. 210—7                                7 Claims

ABSTRACT OF THE DISCLOSURE

BOD-containing waste water such as municipal sewage is mixed with oxygen gas and recycled sludge having 12,000–50,000 p.p.m. total solids to provide mixed liquor of 4,000–12,000 p.p.m. total solids and at least 300 mm. Hg oxygen gas partial pressure, the oxygenated liquor being concentrated and the resulting sludge recycled in a volumetric ratio to the waste water of 0.1–0.5.

CROSS-REFERENCES TO RELATED APPLICATIONS

The following applications relating to oxygenation of BOD-containing water were filed simultaneously with this application:
Ser. No. 838,442, Cyclic Oxygenation of BOD-Containing Water, J. R. McWhirter; Ser. No. 838,467, High Oxygen Utilization in BOD-Containing Water Treatment, J. R. McWhirter; Ser. No. 838,499, Bio-Oxidation With Low Sludge Yield, J. R. McWhirter; Ser. No. 838,500, Staged Oxygenation of BOD-Containing Water, J. R. McWhirter.

BACKGROUND OF THE INVENTION

This invention relates to a method for biochemically treating BOD-containing waste water such as municipal sewage by oxygenation.

With few exceptions, biochemical oxidation methods have employed air as the oxygen source. The quantity of air required to supply oxygen is largely due to the 4/1 dilution with nitrogen, and the mass transfer efficiency of the method is low. However, air is "free" and the large amount of energy which was supplied to the air to satisfy oxygen dissolution requirements was normally sufficient to mix and suspend the bacterial solids in the liquid.

In one biochemical oxidation method which is known as the activated sludge method as applied to municipal sewage treatment, the sewage is mixed with oxygen-containing gas and activated sludge. The latter consists essentially of aerobic organisms which have the ability in the presence of sufficient dissolved oxygen to absorb and assimilate the biochemically oxidizable organic material (BOD) of the municipal sewage, thereby converting the organic material to forms which can be separated readily from the purified water. Under normal conditions the bacteria multiply rapidly in the aeration tanks during this treatment step. When the requisite period of BOD conversion is complete, the mixed liquor is settled, the purified effluent decanted to receiving waters and sludge is withdrawn from the bottom of a clarifier.

A portion of the sludge must be recirculated to the inlet of the treatment tank to inoculate the incoming BOD-containing waste water. In the usual practice the recycled sludge cannot constitute 100% of the sludge withdrawn from the clarifier or the sludge inventory in the system will gradually build to intolerable levels and will overload the clarifier system. Perhaps only about 90% of the sludge may be recycled leaving at least 10% to be discarded. Accordingly there is a substantial net production of sludge from the conventional activated sludge method.

Unfortunately this excess sludge must be further treated to render it non-putrescible before disposition. One commonly employed method is anaerobic (without oxygen) digestion, by long-term storage, e.g. 30 days, sufficient for reasonably complete decay of the organic material. Large covered reservoirs are employed to provide the long residence time and to avoid escape of obnoxious gases; nevertheless the residual solids after anaerobic digestion may still comprise 40–50% of the original volume of excess sludge. Sludge treatment and disposal is expensive and typically represents 35–40% of the total cost of a secondary municipal water treatment.

Prior art activated sludge methods normally operate with 1500–3500 p.p.m. total suspended solids (MLSS) in aeration and with dissolved oxygen concentrations of from near zero to perhaps 2 p.p.m. The recycle sludge after concentration in the clarifier usually contains about 10,000 p.p.m. MLSS or less, and returns at a recycle/feed volume flow ratio of between 0.25 and .50. Settling time in the clarifier is typically 2 to 3 hours and the retention time of the waste water in aeration is between 4 to 6 hours. The effluent, while substantially free of dissolved BOD, is often turbid and contains a high content of disperse bacteria which escape separation in the clarifier. Typically, a municipal sewage plant treating 220 p.p.m. BOD feed water with 2500 p.p.m. MLSS in the mixed liquor is provided with about 250,000-gallons aeration tank capacity per million gallons daily influent.

An activated sludge system is essentially a closed community of bacteria. If allowed to operate without deliberate alteration of the bacterial content, the system would eventually equilibrate at some maximum level of biologically active solids concentration which the food and oxygen supplies can sustain. At equilibrium, the gain in active solids by cell synthesis will equal the loss in active solids by lysis, oxidation of cell residue and by overflow.

In usual practice, the system is not permitted to come to equilibrium because the solids concentration in aeration corresponding to equilibrium is higher than that value which for various reasons is considered most favorable. Therefore, the solids inventory is suppressed by the procedure of wasting sludge to the thickener, continuously or periodically, and at such average rate as to maintain the suspended solids level in the mixed liquor within a predetermined range, e.g., 1500–3500 p.p.m. MLSS.

The primary reasons why the prior art has suppressed the solids concentration in the activated sludge are as follows: First, high solids concentrations have resulted in zones of essentially zero-DO in the mixed liquor, particularly at or near the point of introduction of the waste liquid. When the DO-level drops to zero, there is a shift in the cell synthesis from aerobic strains desirable in the activated sludge method toward anaerobic and facultatively aerobic organisms which are less desirable.

Second, efforts to increase oxygen dissolution rates and to eliminate zero-DO conditions in aeration have resulted in uneconomically high aeration gas compression rates. Moreover, if heavy mechanical agitation is used to increase dissolution of oxygen, the flocculent agglomerates of bacteria are comminuted and dispersed so that the effluent becomes more turbid and contains a higher content of BOD.

Third, it has been reported that increasing the solids concentration in the mixed liquor reduces the settling rate in the clarifier—hence, a larger clarifier is needed to extend the hold-up time and to permit the sludge to become reasonably compact before withdrawal.

Fourth, the maximum sludge density attained in the clarifier has been low. The density bears an inverse relationship to the Mohlman index (SVI), and values of this index are typically 100 or above corresponding to a total solids level of 10,000 p.p.m. or less for the recycle sludge.

Fifth, the inherently low settleability and low compactability of the sludge requires excessive recycle rates to achieve high solids in the mixed liquor. Recycle rates as high as 100% of the waste liquid feed rate have been attempted and this greatly increases the hydraulic load on both aeration basins and clarifier. Thus, the plant size becomes prohibitively large.

Sixth, experience has shown that the overflow of unsettled solids in the effluent increases with an increase in solids concentration in aeration. This may be due either to overloading the clarifier and/or to the highly disperse character of the facultative bacteria resident in the system.

Seventh, prior art efforts to increase the density of the recycle sludge by longer settling times in the clarifier have resulted in the problem of "rising sludge." The phenomenon is attributed to de-nitrification in the clarifier as a result of extended sludge storage under anaerobic conditions. When "rising sludge" occurs, gas evolved in the clarifier forces the sludge blanket upward through the supernatant liquid and over the effluent discharge weir. Bulking in the clarifier is also attributed to the micro-organism Sphaerotilus whose rapid growth is promoted by low dissolved oxygen levels in the cell synthesis zone of the method. This not only depletes the solids needed by the method but also heavily contaminates the receiving waters.

Even in plants where sludge wasting is reduced or eliminated (e.g., in extended aeration plants), the volatile solids concentration (MLVSS) in aeration remains relatively low, e.g., in the range of 3000 to 4000 p.p.m. Such plants repetitively experience "rising sludge" and the gross loss of solids by this phenomenon is responsible at least in part for the apparent limit on solids concentration.

It is an object of this invention to provide an improved method for treatment of BOD-containing waste water such as municipal sewage, which is characterized by high solids concentration in the aeration zone.

Another object is to provide a method which is characterized by high solids concentration yet appreciable dissolved oxygen content in the aeration zone.

Still another object is to provide a method for treating BOD-containing waste water characterized by high solids concentration in the aeration zone, yet high settling rate and high settled sludge density in the clarification zone.

A further object is to provide a highly efficient method for treating municipal sewage characterized by high solids concentration and appreciable dissolved oxygen content in the aeration zone, high settling rate and high sludge density in the clarification zone, and low sludge recycle rate.

Other objects and advantages of this invention will be apparent from the ensuing disclosure and appended claims.

SUMMARY

This invention relates to a method for treating BOD-containing waste water by oxygenation in contact with sludge characterized by a volatile suspended solid to total suspended solids content ratio (MLVSS/MLSS) of at least 0.55. The method is of the general type wherein BOD-depleted solid is settled in a clarification zone and at least a portion thereof recycled to the aeration zone as the sludge.

More particularly, according to this method BOD-containing waste water, sludge having 12,000 to 50,000 p.p.m. total suspended solids content and feed gas comprising at least 50% oxygen (by volume) are mixed in an oxygenation zone in sufficient relative quantities to provide mixed liquor of 4000 to 12,000 p.p.m. total suspended solids content. Sufficient feed gas is introduced in the oxygenation zone to provide gas above the mixed liquor having oxygen partial pressure of at least 300 mm. Hg. The liquor is mixed with oxygen gas in the oxygenation zone for 20 to 180 minutes solids residence time to form oxygenated liquor having DO content of at least 3 p.p.m. The average food-biomass ratio for the liquor during the mixing is maintained at least at 0.15 pound $BOD_5$/day $\times$ pound volatile suspended solids. This oxygenated liquor is separated into the aforementioned sludge and clarified effluent, and at least part of the sludge is recycled to the oxygenation zone at flow rate relative to the BOD-containing waste water such that the recycling sludge/BOD-containing water volume ratio is 0.1 to 0.5.

This invention has been successfully used to treat municipal sewage in a significantly more efficient manner than the conventional air aeration activated sludge method.

DESCRIPTION OF THE PREFERRED EMBODIMENTS

Figure 1:
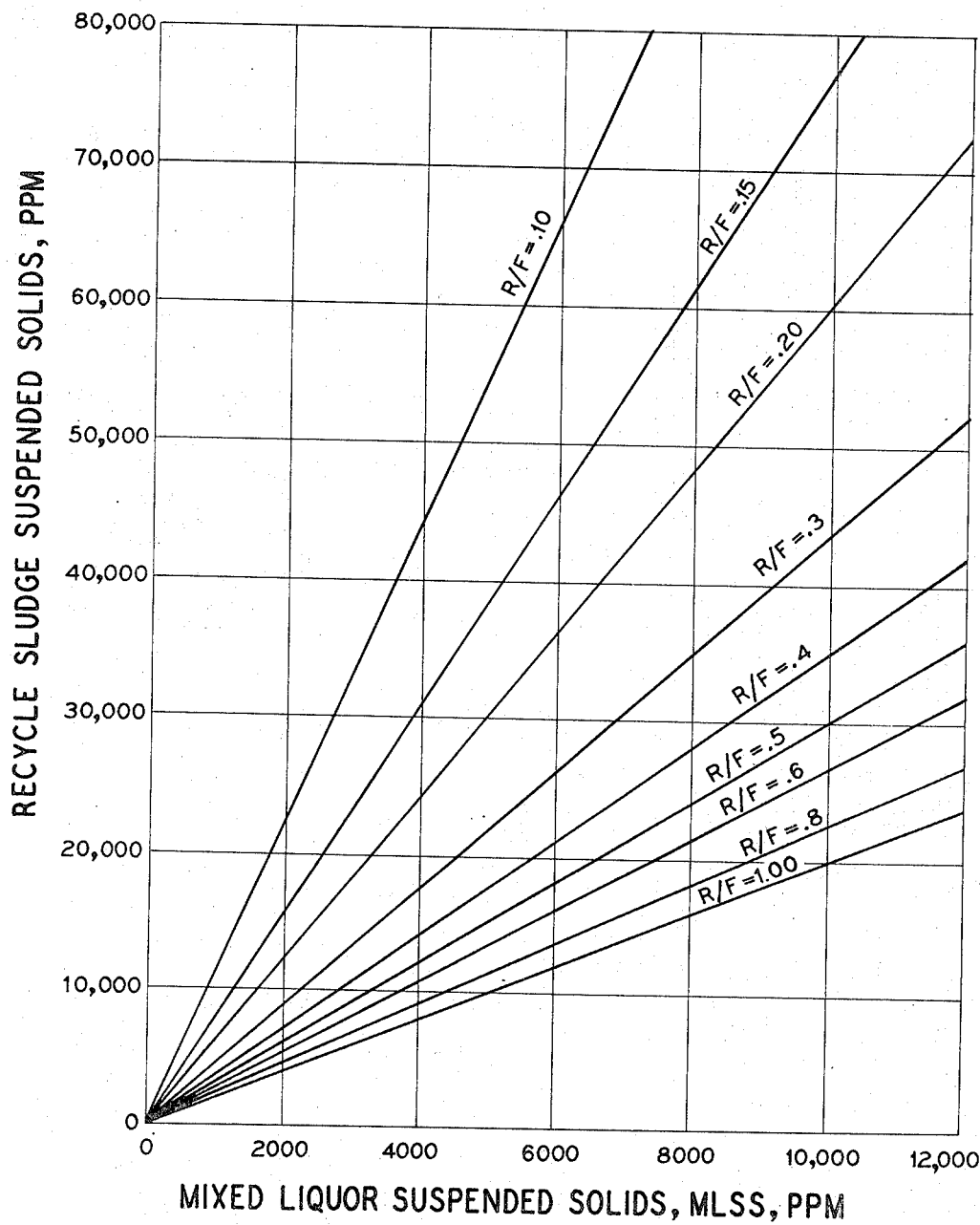
FIG. 1 is a graph showing the relation between the recycle sludge suspended solids concentration and the mixed liquor solids concentration, for various volume ratios of recycling sludge/BOD-containing water.

As previously indicated, the sludge mixed with the oxygen gas and BOD-containing waste water in the oxygenation zone is concentrated to between 12,000 and 50,000 p.p.m. total suspended solids. Concentrations above 50,000 p.p.m. require excessively long residence time in the clarifier—time in addition to that needed to merely separate the effluent so that the settled sludge will become highly compact. Such high recycle sludge concentration also tends to permit anaerobic conditions for a prohibitively long period thereby reducing the overall efficiency of the treatment method. On the other hand, concentrations below 12,000 p.p.m. do not provide sufficient solids in the mixed liquor for volume ratio of sludge/BOD-containing water below about 0.5, as demonstrated by FIG. 1. For example, a recycle sludge solids concentration of 12,000 p.p.m. and a recycle sludge/feed volume ratio ($R/F$) of 0.5 corresponds to a mixed liquor suspended solids concentration of 4,000 p.p.m., the lower limit for mixed liquor concentration required to realize the advantages of this invention. With a recycle sludge solids concentrations of 10,000 p.p.m., the $R/F$ ratio must be about 0.7 to achieve the 4,000 p.p.m. mixed liquor suspended solids concentration. Recycle sludge/feed volume ratios above 0.5 impose lower treatment efficiency and higher aeration power costs for a given size system, or larger components, i.e. oxygenation chambers, fluid transfer piping, and clarifier.

The mixed liquor in the oxygenation zone has 4,000 to 12,000 p.p.m. total suspended solids. At least 4,000 p.p.m. total suspended solids is necessary to achieve high rates of BOD absorption and assimilation by the sludge, necessary to realize shorter liquor treatment times and smaller equipment as compared to the prior art air aeration method.

As previously indicated, mixed liquor total suspended solids concentrations above about 12,000 p.p.m. require prohibitively high solids concentrations in the recycling sludge, i.e. above 50,000 p.p.m. Another reason for this 12,000 p.p.m. upper limit on the mixed liquor suspended solids concentration is to avoid inhibiting settling rate, which in turn results in prohibitively long solids settling time. Whereas solids tend to settle more rapidly in relatively dilute mixtures, as the solids concentration increases to a high level, the solids themselves tend to limit the solids settling rate. For a particular size oxygenation chamber, mixed liquor composition and desired level of BOD assimilation and biochemical oxidation, increased settling time requires very large, expensive clarifiers. Moreover, the long retention time of the solids in the clarifier without aeration may result in anaerobic conditions which in turn may cause loss of biological activity, denitrification, and the well-known phenomenon of "rising sludge."

Still another reason for limiting the mixed liquor total suspended solids content to 12,000 p.p.m. is to avoid reducing the food/biomass ratio ($BOD_5$/day$\times$lb. MLVSS) to a level at which the sludge biological activity and settling rates are limited. Stated otherwise, for a fixed ratio of volatile suspended solids to total suspended solids in the liquor (MLVSS/MLSS), the food/biomass ratio diminishes as the total solids level increases in the oxygenation zone, and there is insufficient food (from the BOD-containing water) to feed the increasing quantity of active biomass.

Biological oxidation systems which benefit from this invention are characterized by solids in the system having MLVSS/MLSS ratios of at least 0.55. The MLVSS/MLSS ratio for the mixed liquor is very similar to that of the recycle sludge as the waste water adds a relatively small quantity of solids to the system. High total solids content in aeration are advantageous only insofar as they reflect high content of biologically active material. If the ratio is below 0.55, the active solids level will be low or modest even though total solids are very high. Ratios below 0.55 mean that a large amount of inert nonbiodegradable solids have accumulated in the system and are being recirculated repeatedly through aeration and sedimentation. In order to obtain the high biological activity solids levels in aeration needed for high-rate treatment, the recycle rate of total solids must necessarily be very high. Excessive amounts of inert solids can therefore over-burden the system and prevent operation within the required limitations of the invention.

The value of the MLVSS/MLSS ratio is not always controllable and is determined largely by the type of pollutants contained in the waste water. Such pollutants may be soluble or insoluble, organic or inorganic, biochemically oxidizable or non-biodegradable. Any solids such as sand, grit, polyethylene fragments or wood fiber which are not converted to $CO_2$, water or cell tissue, and are deposited in the settled sludge, will augment the inerts in the system and reduce the ratio. One method of controlling the accumulation of inert solids is to suppress the auto-oxidation of bacteria and to discard larger quantities of excess sludge from the system. Another positive control available to the operator is to occasionally remove the system from service, dispose of the solids and start afresh with a new culture.

The concentration of biologically oxidizable organic material in municipal waste is sufficiently high so that volatile to total suspended solids ratio above 0.55 can be readily maintained in the sludge and mixed liquor. For example MLVSS/MLSS ratios of 0.70 to .75 have been measured in the treatment of wastes from two different municipalities. The concentration of biologically oxidizable organic material in dairy and petrochemical waste is also high enough to provide this ratio.

The feed gas to be mixed with BOD-containing waste water and recycled sludge in the oxygenation zone must comprise at least 50% by volume oxygen. Lower oxygen concentrations do not permit the establishment and maintenance of an appreciable DO content in the oxygenation zone because of dilution by the other feed gas constituent(s), e.g. nitrogen and carbon dioxide. It is also necessary to provide this feed gas in sufficient quantity to maintain gas above the mixed liquor having oxygen partial pressure of at least 300 mm. Hg in the oxygenation zone. This high partial pressure driving force (at least twice that available with air) provides the necessary rate of oxygen dissolution into the mixed liquor without expending prohibitive power for agitation and without performing excessive mechanical attrition on the biomass floc, reducing its agglomerate size and thus impairing its settling properties.

It has also been discovered that aeration gas affording oxygen partial pressure of at least 300 mm. Hg is necessary to produce a heavy, settleable active biomass, aside from the associated influences of appreciable DO level and low mixing energy. In comparative bio-oxidation tests using 21% and 99.5% oxygen at about 1 atmosphere (160 mm. and 755 mm. Hg respectively), but otherwise with equal energy input, with equal food/biomass ratio, and with high DO levels of at least 7 p.p.m., it was found that 99.5% oxygen produced the desirable dense biomass floc. The 21% oxygen produced a light, diffuse suspension which settled poorly leaving a turbid supernatant liquid. Moreover, this influence of an oxygen-enriched aeration gas on the floc density remained strong at oxygen partial pressure of 380 mm. Hg (dense biomass), diminished at 300 mm. Hg (moderately dense biomass) and essentially vanished at about 250 mm. Hg (light, diffuse biomass). To achieve consistently high settling rates and dense sludge with relatively short liquor retention time, it is preferred to employ feed gas comprising at least 90% oxygen and in sufficient quantity to provide an oxygenation gas above the mixed liquor with oxygen partial pressure of at least 380 mm. Hg.

The oxygen gas-sludge-BOD containing water mixing step is continued for 20 to 180 minutes. If the object of the particular system employing this method is to simply remove municipal waste water's BOD content by absorption and assimilation in the sludge and provide a clean effluent, the mixing time may be relatively short, e.g. 20 minutes. If the object is to not only absorb and assimilate the BOD but also to auto-oxidize the sludge to the extent that the net production of sludge is substantially reduced, the mixing time will be considerably longer, i.e. up to 180 minutes. Based on either performance criteria, this invention permits a substantial reduction in mixing time as compared with the conventional air aeration. For example, to achieve substantial auto-oxidation in municipal waste treatment, the prior art has extended the aeration time from the 4–6 hours of common practice to at least 18–24 hours. It will be apparent that longer mixing times proportionately increase the costs of supplying aeration basin capacity, gas and agitation. Relatively longer mixing times may be required for waste water such as the petrochemical type, having higher BOD level than municipal waste water.

As discussed hereinafter in detail, the mixing may be performed in a single zone or a multiplicity of zones wherein the oxygenated liquor flows from zone to zone. The aferomentioned mixing duration of 20 to 180 minutes refers to the total period in which a particular quantity of solids are mixed with oxygen gas. By way of example, if the aeration with oxygen gas occurs in four separate zones, the mixing time is the sum total gas-liquor contact times for all zones. Moreover, if the concentrated solid is aerated (stabilized) after separation from the effluent, the mixing time includes the aeration time for both mixed liquor and concentrated solids.

Another important aspect of this method is continuing the oxygen gas-liquor mixing step to form oxygenated liquor having a dissolved oxygen content (DO) of at least 3 p.p.m. Where more than one oxygen mixing zone is employed, the liquor discharged from the mixing zone immediately preceding the clarification zone has a DO of at least 3 p.p.m. As discussed hereinafter in detail, this mixing zone may be the final oxygenation zone as exemplified by FIG. 5 or an intermediate oxygenation zone as for example illustrated in FIG. 6. Such dissolved oxygen levels are highly desirable to insure aerobic conditions and adequate driving force for biochemical oxidation, but have normally been unattainable in prior art air aeration systems with mixed liquors containing 4,000–12,000 p.p.m. total suspended solids, i.e. the high concentrations characteristic of this invention. The prior art limitation was due to the rapid assimilation of BOD and the concurrent uptake of dissolved oxygen by the sludge; oxygen could not be dissolved at sufficient rate to sustain the DO level. A DO level of at least 3 p.p.m. in the oxygenated liquor entering the clarifier is not only necessary to avoid a cronic DO-depleted condition in the mixed liquor but additionally to accommodate momentary peaks in the BOD level fed to a plant. Moreover, the large, relatively dense floc particles which characterize the sludge produced by the method of this invention present a diffusional resistance to the penetration of dissolved oxygen from the surface to the center of the floc particle. An adequate rate of diffusion requires a high DO level in the liquor, and is assured by a concentration of at least 3 p.p.m. $O_2$ in oxygenated liquor discharged from the mixing step. Another important reason for maintaining the DO of the oxygenated liquor at least at 3 p.p.m. is to insure that the effluent from the clarification zone may be introduced to a larger water body, e.g. a river, without depleting its oxygen concentration. Moreover, this method offers the opportunity of introducing an effluent with appreciably higher DO level than the larger water body, an advantage which is often economically impossible with conventional air treatment of waste water.

To obtain biologically active sludge characterized by high settleability, this invention requires control of the mixing step parameters so as to maintain the food to biomass average ratio at least at 0.15 lb. $BOD_5$/day×lb. MLVSS. This was demonstrated by a series of tests in which 99.5% oxygen gas was continuously mixed with municipal waste and recycled sludge to form mixed liquor. The latter was oxygenated in four consecutive mixed liquor stages by cocurrently staged oxygen-containing gas. The waste feed rate and BOD content (hence the food to biomass ratio) fluctuated greatly between day and night. This fluctuation resulted in very substantial cyclic changes in the sludge initial settling rate and Sludge Volume Index, as demonstrated by Table I. All measurements during these tests were conducted in accordance with the standard practices of the waste treatment industry as for example outlined in "Standard Methods for the Examination of Water and Wastewater Including Bottom Sediments and Sludges," published by the American Public Health Association, Inc., 11th Ed. (1962).

TABLE I

| | Period A | | Period B | | Period C | |
|---|---|---|---|---|---|---|
| | Day | Night | Day | Night | Day | Night |
| Waste water feed rate, g.p.m. | 8.4 | 4.8 | 9.8 | 5.3 | 11.3 | 5.0 |
| Recycle sludge, g.p.m. | 1.6 | 1.6 | 1.5 | 1.5 | 1.6 | 2.3 |
| Recycle sludge/feed, vol./vol. | 0.19 | 0.33 | 0.15 | 0.28 | 0.14 | 0.46 |
| Feed waste water, BOD, p.p.m. | 187 | 99 | 250 | 156 | 227 | 103 |
| Mixed liquor MLSS, p.p.m.: | | | | | | |
| Stage 1 | 5,743 | 8,390 | 4,826 | 7,319 | 4,701 | 9,269 |
| Stage 4 | 5,623 | 8,047 | 5,176 | 7,149 | 4,873 | 8,784 |
| MLVSS, p.p.m.: | | | | | | |
| Stage 1 | 4,406 | | | | | 6,757 |
| Stage 4 | 3,879 | | | | | 6,631 |
| MLVSS/MLSS (Stage 1) | 0.77 | | | | | 0.73 |
| SVI: | | | | | | |
| Stage 1 | 52 | 66 | 56 | 74 | 58 | 99 |
| Stage 4 | 49 | 70 | 57 | 94 | 59 | 99 |
| Recycle Sludge: | | | | | | |
| MLSS, p.p.m. | 41,379 | 39,723 | 38,629 | 31,013 | 41,512 | 31,543 |
| MLVSS, p.p.m. | 31,334 | | | | | 24,002 |
| MLVSS/MLSS | 0.76 | | | | | 0.76 |
| Initial settling rate, ft./hr.: | | | | | | |
| Stage 1 | 5.8 | 1.3 | 5.8 | 1.7 | 6.4 | 0.3 |
| Stage 4 | 5.8 | 1.3 | 5.8 | 0.9 | 6.4 | 0.3 |
| Food/Biomass avg. ratio, lb. BOD/day lb. MLVSS | 0.31 | 0.064 | 0.55 | 0.13 | 0.63 | 0.07 |

A possible explanation for relatively high settling rates and dense active biomass at food/biomass ratios above 0.15 is that the biomass possesses an abundance of substance(s) produced by the bacteria which promote agglomeration and flocculation of the particles. Under low food/biomass conditions below a ratio of 0.15, this substance is consumed to sustain the organisms so that the floc particles become structurally weak and are dispersed. Another possible explanation is that cell destruction (lysis) accelerates under food-depleted conditions and results in weakening the structure of the floc particles.

It should be noted that as used herein, the average food/biomass ratio of at least 0.15 $BOD_5$/day×lb. MLVSS is based upon the sum of volatile suspended solids in all oxygenation zones where more than one zone is employed. In embodiments wherein the liquor is staged through several zones the ratio will vary widely from the average value, being much higher in the initial treatment zone and far lower in the final treatment zone. By way of illustration, if four liquor treatment zones are employed as in FIG. 4 with equal liquor flow rate and MLVSS but different liquor retention times $T_1$, $T_2$, $T_3$ and $T_4$, and corresponding food/biomass ratios of 0.4, 0.3, 0.2 and 0.1, the average ratio is $$(0.4T_1+0.3T_2+0.2T_3+0.1T_4)/(T_1+T_2+T_3+T_4)$$

In the FIGS. 2–6 embodiments, corresponding components have been identified by the same reference numbers for simplicity.

Figure 2:
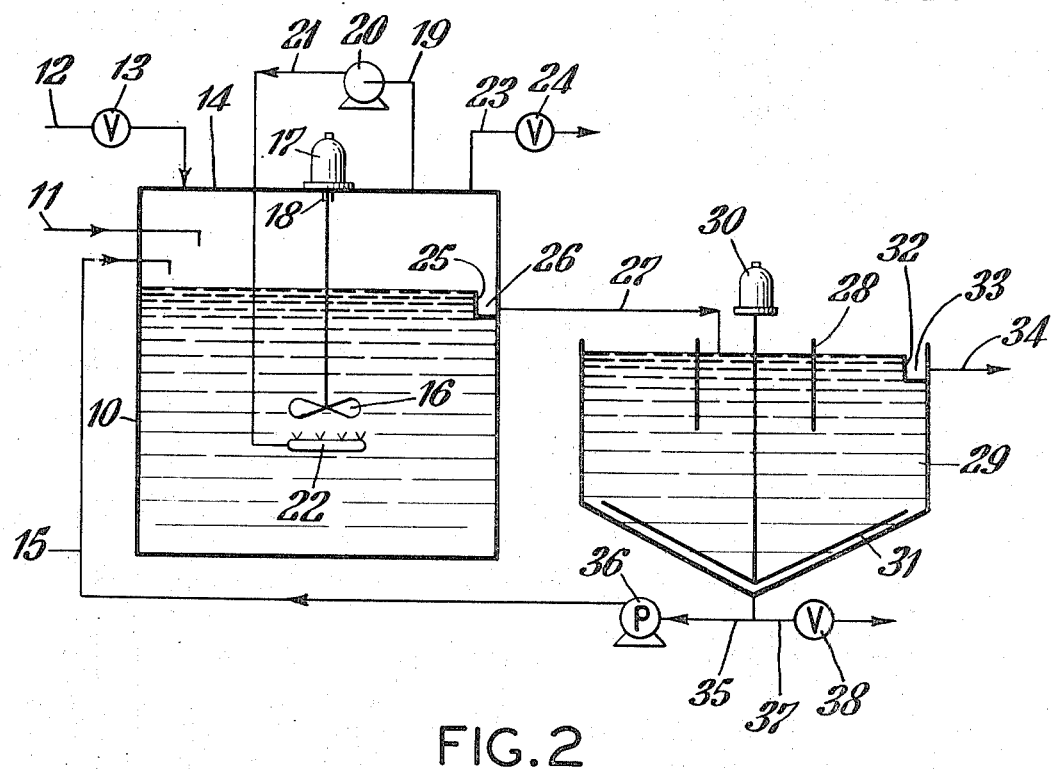
FIG. 2 is a schematic view taken in cross-sectional elevation of apparatus including a single submerged agitator and sparger assembly within an oxygenation chamber, and a clarifier arranged to practice one embodiment of the invention.

Referring now to FIG. 2, BOD-containing water, as for example municipal sewage, enters chamber 10 through conduit 11. A source (not shown) of oxygen comprising at least 50% oxygen is provided and the oxygen gas is flowed therefrom through conduit 12 having control valve 13 therein to chamber 10. The latter is provided with gas-tight cover 14 to maintain an oxygen-enriched environment over the liquor. Recycling sludge having 12,000–50,000 total suspended solids is also introduced to chamber 10 through conduit 15, although the BOD-containing feed water and sludge may be mixed prior to introduction in the chamber if desired.

The aforementioned streams are intimately mixed in chamber 10 as the mixing zone by mechanical agitation means 16 driven by motor 17 having a shaft passing through seal 18 in the cover 14 Although the agitation means may comprise one or more impellers located near the liquor surface, it is illustrated as positioned below the surface. In this particular embodiment, oxygenating gas disengaged from the liquor into the overhead gas space is withdrawn through conduit 19 by blower 20 for compression and return through conduit 21 to submerged sparger or diffuser 22 preferably positioned beneath agitator 16. Blower 20 is driven by a motor (not illustrated) and is preferably provided with controls to permit adjustment of its speed of rotation. Oxygen-depleted or spent oxygenation gas is discharged from chamber 10 through restricted flow conduit 23 which may also be provided with flow control valve 24.

To practice the method of this invention, the BOD-containing water, oxygen-rich feed gas and sludge are mixed to form the mixed liquor of 4,000–12,000 p.p.m. total suspended solids content characterized by a MLVSS/MLSS ratio of at least 0.55, and the oxygenating gas is continuously recirculated into the liquor for dissolution. Inert gases such as nitrogen entering with the BOD-containing water and with the oxygen-rich feed gas, and gases such as $CO_2$ produced in the biochemical reaction are evolved and collected with unconsumed oxygen in the space above the liquor. This gas has an oxygen partial pressure of at least 300 mm. Hg and preferably at least 380 mm. Hg. The oxygen-rich gas may be continuously introduced to chamber 10 through conduit 12 during the mixing step, or the gas flow may be terminated when mixing is started. Similarly, the oxygen-depleted gas may be continuously discharged from the overhead space through conduit 23, or only discharged on completion of the mixing step. As a further alternative the mixing step may be performed cyclically, whereby the BOD-containing water, recycle sludge and a first quantity of oxygen-rich feed gas are mixed in a first cycle to produce partially oxygenated liquor and unconsumed oxygen-containing gas of lower purity than the feed gas. This spent gas is discharged through conduit 23 and a second quantity of oxygen-rich feed gas is introduced through conduit 12 for mixing in a second cycle preferably with liquor comprised at least in part of the partially oxygenated liquor from the first cycle. This method is described more completely and claimed in U.S. patent application Ser. No. 838,442, "Cyclic Oxygenation of BOD-Containing Water" filed simultaneously and in the name of John R. McWhirter.

The liquor level in enclosure 10 is controlled by weir 25 which discharges into overflow trough 26 and thence through discharge conduit 27. The dissolved oxygen level in the oxygenated liquor formed in the mixing step is maintained at least at 3 p.p.m. Adjustments in DO level may be accomplished by varying the rate of oxygen-rich feed gas flow using valve 13 in conduit 12 thereby increasing or decreasing the oxygen partial pressure in the enclosure 10 gas space. The DO level may also be adjusted by varying the power input and speed of rotation of blower 20, thereby increasing or decreasing the rate of diffusion of oxygenating gas into the liquor. The DO level may also be controlled by varying the retention time of the liquor in chamber 10. All other parameters being constant, a longer liquor retention time tends to provide a higher DO level.

At the end of the mixing step of 20 to 180 minutes duration, oxygenated liquor is discharged through conduit 27 to within a central concentric baffle 28 of clarifier 29. Baffle 28 preferably extends from above the liquid level to a point intermediate this level and the clarifier's conical bottom. Motor 30 drives a slowly rotating rake 31 across the clarifier bottom to prevent "coning" of the dense settled sludge. The purified supernatant liquid overflows weir 32 into trough 33 and is discharged through conduit 34. The sludge is withdrawn from the clarifier bottom through conduit 35 and at least a portion thereof is pressurized by pump 36 for recycling in conduit 15 to enclosure 10 for inoculation of the incoming BOD-containing water. Any sludge not needed for recirculation is discharged through bottom conduit 37 having control valve 38 therein. As previously discussed, the volume ratio of recycling active sludge/BOD-containing water is maintained in the range of 0.1 to 0.5. This ratio may be maintained by varying the speed of pump 36.

Figure 3:
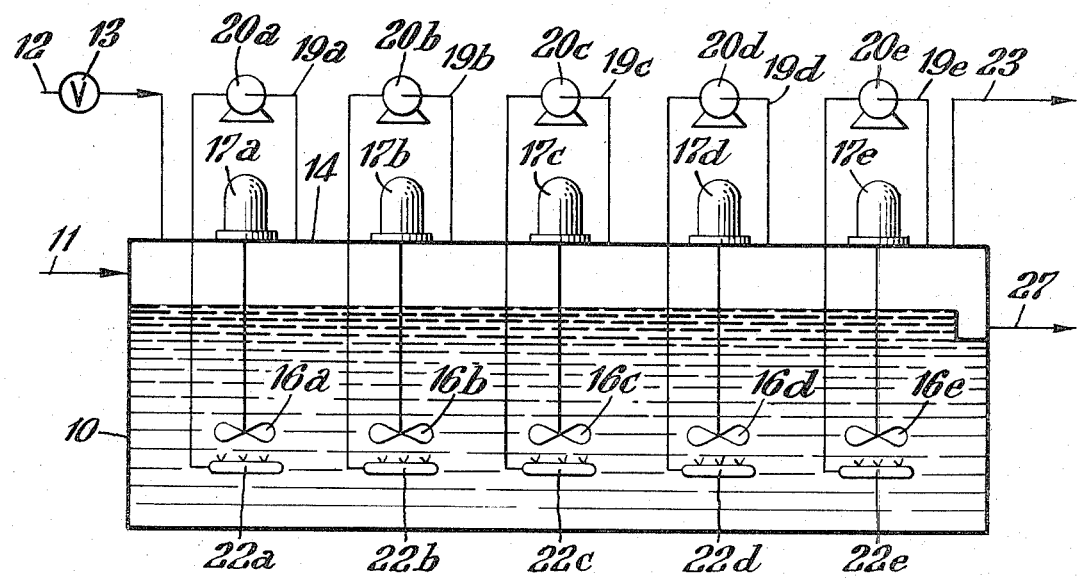
FIG. 3 is a schematic view taken in cross-sectional elevation of apparatus characterized by a multiplicity of submerged agitators and spargers all positioned within the same oxygenation chamber to practice another embodiment.

FIG. 3 illustrates another embodiment employing a multiplicity of submerged agitators 16a–e and recirculation oxygen enriched gas spargers 22a–e spaced longitudinally from end-to-end of oxygenation enclosure 10. After premixing, BOD-containing water and recycling sludge are introduced through conduit 11 at one end of enclosure 10. The resulting liquor is mixed with oxygen-rich gas introduced through conduit 12 and the oxygenated liquor discharged from the opposite end of enclosure 10 through conduit 27 to a clarifier (not shown). Oxygen depleted gas is also discharged from the space above the liquor level and at this opposite end through conduit 23. Oxygenating gas is withdrawn through longitudinally spaced conduits 19a–e for pressure recirculation through blowers 20a–e and spargers 22a–e in a manner analogous to the FIG. 2 embodiment.

Enclosure 10 may be designed so that its length is very large relative to its width and depth. For a given enclosure volume such geometry increases the velocity of liquor flow from feed end to discharge end, and suppresses backmixing of liquor from downstream zones into upstream zones. Such suppressed backmixing or plug flow is beneficial when multiple mixing means are employed in the instant method. When backmixing is prevented, the food/biomass ratio is high at the feed end of the enclosure where the BOD-containing water enters, and is low at the discharge end where the oxygenated liquor overflows to the clarifier. Both of the local conditions are beneficial to complete and high rate bio-oxidation, and are representative of a preferred embodiment wherein a multiplicity of staged liquid oxygenation zones are employed. If backmixing is permitted, e.g. by other oxygenation enclosure geometry, the food content at the feed end would be diluted with partly oxygenated liquor from downstream zones while a portion of the liquor discharged to the clarifier would have by-passed complete treatment and still contain unassimilated BOD.

Prior art multiple air aerator systems have not had the capacity to supply sufficient oxygen to avoid anaerobic conditions in a zone of high solids and high food/biomass ratio. Accordingly, it has usually been preferable to operate a substantial portion of the air aeration systems at the feed end under completely mixed conditions with no appreciable BOD gradient. In this manner the high BOD feed water was diluted and the BOD content deliberately dispersed into the downstream aerations zones.

It will be apparent from the foregoing description of FIG. 3 that the liquor is oxygenated in a series of stages from the feed to the discharge end of container 10 even though the stages are not physically partitioned from each other. If container 10 is designed with small lateral cross-sectional area in the gas space beneath cover 14, a similar staged or plug flow effect can be realized in the oxygenation gas flow from feed to discharge end. This also promotes virtually complete BOD removal at high flow rate, because a substantially higher partial pressure of oxygen can be maintained over the liquor at the feed gas end. Another advantage of staged gas flow is that the inert gaseous impurities can be dischraged from the opposite end in a smaller volume of vent gas. As the oxygenation gas flows from end-to- end of the enclosure 10 the rate of oxygen dissolution into the liquor is substantially greater than the rate of inert gas evolution from the liquor. Accordingly, the volume of the oxygenating gas stream progressively diminishes and its fractional content of inerts increases from the gas feed to discharge end. It is desirable to aerate the high food/biomass zone (where BOD-containing water is introduced) with the gas of highest oxygen content available because the oxygen demand is greatest in this zone. Conversely, the oxygen demand is lowest at the oxygenated liquor discharge region and it is preferable to employ the available aeration gas of lowest oxygen content in this region. Accordingly, in embodiments of this invention wherein liquor is flowed through a multiplicity of zones for staged mixing with oxygen-containing gas, it is also preferred to flow the aeration gas cocurrently with the liquor from stage-to-stage with the gas of highest oxygen content mixing with the water of highest BOD.

Figure 4:
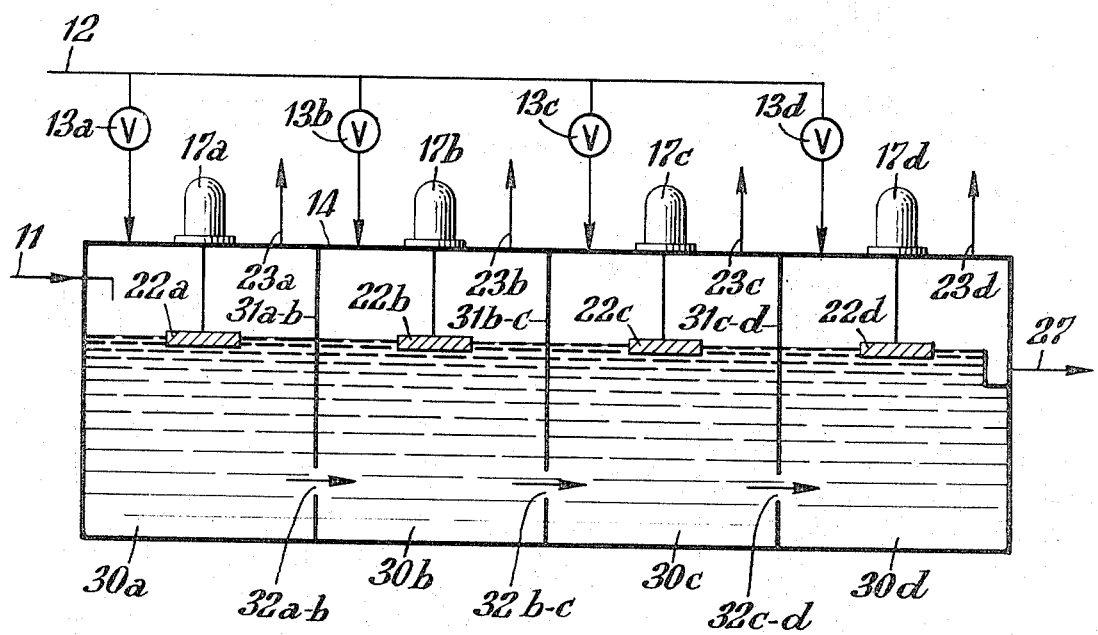
FIG. 4 is a schematic view taken in cross-elevational elevation of apparatus characterized by a multiplicity of oxygenation chambers each having a surface-type mixer and oxygen feed gas introduction means, and arranged for staged flow of oxygenated liquor.

The FIG. 4 apparatus illustrates a mixing chamber 10 divided into four separate compartments or stages 30a, 30b, 30c and 30d. Partition 31a–b extends from bottom to top of chamber 10 to separate first and second compartments 30a and 30b. Similarly, partition 31b–c separates second and third compartments 30b and 30c, and partition 31c–d separates third and fourth compartments 30c and 30d. Restricted opening 32a–b provides flow of partially oxygenated liquor from first compartment 30a to second compartment 30b, restricted opening 32b–c provides flow of further oxygenated liquor from second compartment 30b to third compartment 30c, and restricted opening 32c–d provides flow of still further oxygenated liquor from third compartment 30c to fourth compartment 30d.

Oxygen-rich gas is introduced through manifold 12 and control valves 13a, 13b, 13c and 13d in branch conduits to each of the four compartments for simultaneous mixing therein with BOD-containing liquor. These valves may for example, be responsive to a suitable measured variable such as DO level in the liquor or gas composition within the compartment. Surface type aerators 22a, 22b, 22c and 22d are used to mix the oxygen-containing aeration gas in each compartment with liquor. Because the chamber walls and partitions confine the fluids within each compartment, surface mixers may be used in this embodiment without backmixing of the liquor thrown upward and outward of the impeller. The oxygen-depleted gas disengaged from the liquor is discharged from each compartment through restricted flow conduits 23a, 23b, 23c, and 23d. These conduits may be provided with flow control valves if desired.

An advantage of the FIG. 4 apparatus is the close approach to true plug flow of liquor. The liquor velocity through restricted openings 32a–b, 32b–c and 32c–d is sufficient to prevent backmixing. The liquor in each compartment or stage is substantially uniform in composition and the BOD content progressively declines from the liquor feed stage 30a to the liquor discharge stage 30d.

Figure 5:
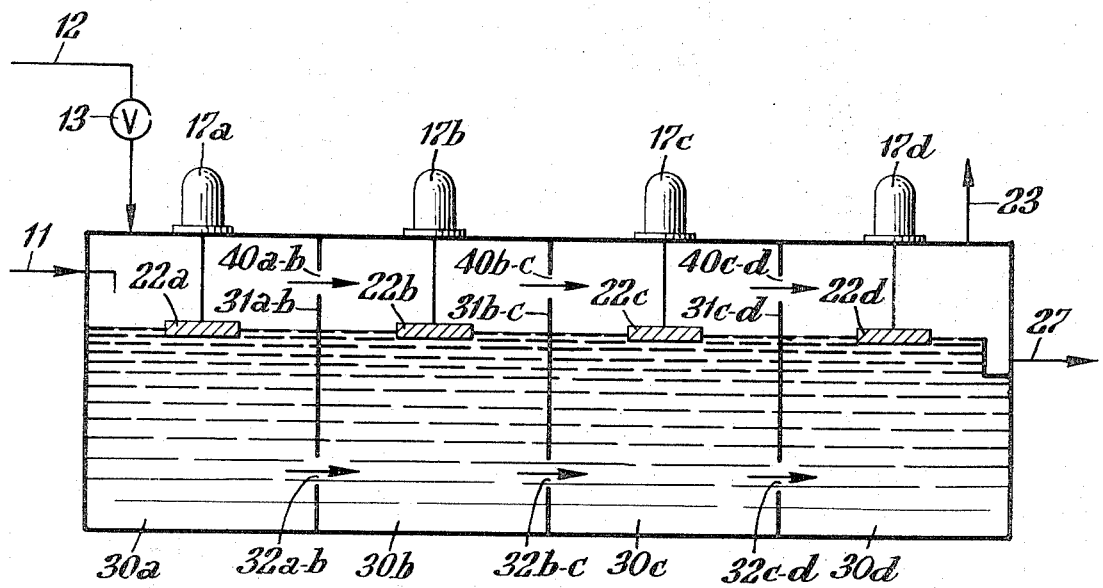
FIG. 5 is a schematic view taken in cross-sectional elevation of apparatus similar to FIG. 4 but with means for staged flow of oxygen-depleted gas cocurrent to the oxygenated liquor staging.

The FIG. 5 apparatus differs from FIG. 4 in the provision of flow restricting openings in the upper portions of partitions 31a–b, 31b–c and 31c–d above the liquor in the compartments. Oxygen-depleted gas from first compartment 30a flows through opening 40a–b into second compartment 30b as the feed gas therefor, and with sufficient pressure differential to prevent backmixing. In the second compartment 30b additional oxygen of the aeration gas is consumed by dissolution and biooxidation in the partially oxygenated liquor, and additional inert gases evolve into the aeration gas from the liquor. Further oxygen-depleted gas flows through restrictive opening 40b–c into third compartment 30c for mixing therein with further oxygenated liquor having entered through flow restricted liquor opening 32b–c. The third stage 30c operates in the same manner as second stage 30b, and still further oxygen-depleted gas passes therefrom through flow restricted opening 32c–d. Aeration gas of lowest oxygen content and highest inerts content is vented from fourth chamber 30d through conduit 23 at restricted rate, and oxygenated liquor of lowest BOD content is discharged through conduit 27 for passage to a clarifier (not shown).

Summarizing the method embodiment as practiced in the FIGS. 4 and 5 apparatus, liquor is transferred through a multiplicity of zones for staged mixing with oxygen containing gas in each zone such that the food content (BOD) of the liquor in a particular zone is higher than the liquor in the next zone to which the first mentioned liquor is passed. Moreover, the liquor discharged from the last zone is the liquor which is separated into sludge and clarified effluent. In FIG. 5, unconsumed oxygen containing gas is transferred through the multiplicity of zones for staged mixing with liquor in each zone such that the oxygen content (volume percent oxygen) of the gas above the liquor in a particular zone is higher than the corresponding gas in the next zone to which the first mentioned gas is passed, the gas flowing cocurrently with the liquor from zone-to-zone. Whereas the feed gas introduced to the first zone for mixing with BOD-containing water comprises at least 50% oxygen (by volume) the aeration gas introduced to any or all of the succeeding zones may be lower oxygen purity. For example, if the feed gas to a four-stage system is 50% oxygen the gas introduced to the second stage may contain on the order of 40% oxygen. Oxygen gas staging is described more completely and claimed in U.S. application Serial No. 838,500 "Staged Oxygenation of BOD-Containing Water" filed simultaneously in the name of John R. McWhirter.

Figure 6:
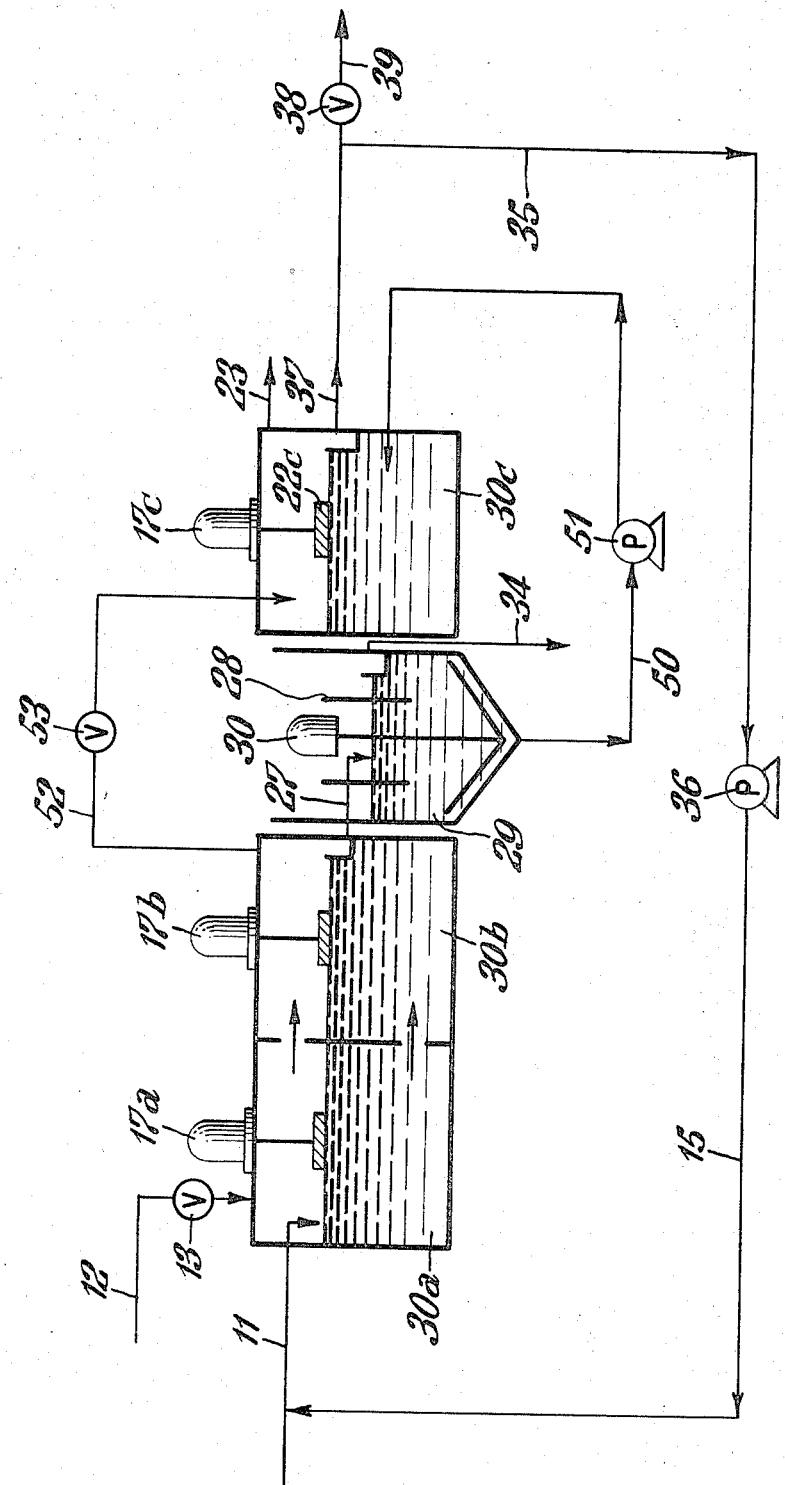
FIG. 6 is a schematic view taken in cross-sectional elevation of apparatus similar to FIG. 5 but with means for concentrating BOD-depleted solids between oxygenation stages.

The FIG. 6 apparatus differs from the previously described multi-stage systems in that clarifier 29 is positioned intermediate second oxygenation compartment 30b and third oxygenation compartment 30c with respect to liquor flow. Further oxygenated liquor is discharged from compartment 30b through conduit 27 and flowed to clarifier 29 for separation into supernatant liquid and more concentrated solid. The former is discharged through conduit 34 and the latter is withdrawn from the clarifier bottom through conduit 50 for flow to third oxygenation compartment 30c by pump 51.

Further oxygen-depleted aeration gas is discharged from second oxygenation chamber 30b in flow restricting conduit 52 and introduced to third oxygenation chamber 30c as the aeration gas for mixing with the concentrated solid introduced through conduit 50. Control valve 53 may be provided in gas transfer conduit 52 if required. The still further oxygenated solid discharged from third compartment 30c in conduit 37 is at least partly recycled through conduits 35 and 15 to first compartment 30a as the sludge.

The advantages of this invention were demonstrated in a series of tests using a system similar to FIG. 5 and municipal sewage as the BOD-containing waste water. Four 457-gallon oxygenation chambers were provided in a rectangular covered tank, 14 ft. long x 5 ft. wide x 4 ft. deep, fitted with interstage vertical baffles extending from top to bottom. The clarifier was a cylindrical wall-conical bottom unit of 8 ft. diameter and 4½ ft. center depth. A bottom rake was rotated at 4 r.p.h. by a motor and speed reducer assembly. The liquor from the fourth oxygenation chamber was introduced at a center concentric baffle in the clarifier upper end, and the concentrated sludge withdrawn at the center of the conical bottom.

The mixing system for each chamber consisted of a ½-HP motor-driven submerged variable speed axial flow 6-inch diameter impeller which dispersed gas from a stationary sparger located directly beneath the agitation impeller. The spargers were constructed of ½-inch diameter pipe with sixteen spaced 1/16-inch diameter orifices. A variable speed sliding vane rotary compressor was used to recirculate the oxygenating gas from the overhead gas space of each chamber back to the submerged sparger.

Oxygen gas at 99.5% purity was supplied from pressure-regulated liquid storage cylinders. The feed oxygen was saturated with water and then introduced into the gas space above the mixture of BOD-containing water and recycled sludge in the first chamber. The unconsumed oxygen gas (plus disengaged inert diluent and reaction product gas) was conducted to each succeeding stage by a 24–30 inch length of two-inch diameter tubing joining openings through the cover over adjacent chambers. These interconnections were of such size as to provide restricted sequential gas flow from the first to the fourth oxygenation chamber under a stage-to-stage pressure differential of about 0.12-inch $H_2O$. The liquor flowed in the general pattern illustrated by arrows in FIG. 5.

Table II is a summary of values for four selected days operation. All measurements summarized in Table II were performed in accordance with the procedures outlined in the previously referenced "Standard Methods for the Examination of Water and Wastewater Including Bottom Sediments and Sludges."

TABLE II

|  | Day A | Day B | Day C | Day D |
|---|---|---|---|---|
| BOD-containing water feed: |  |  |  |  |
| Rate, g.p.m | 9.7 | 9.5 | 10.1 | 8.4 |
| BOD, p.p.m | 253 | 200 | 168 | 171 |
| SS [1], p.p.m | 118 | 147 |  | 249 |
| Oxygen Feed: |  |  |  |  |
| Rate, c.f.h | 16.8 | 20.6 | 29.5 | 27.2 |
| Purity, vol. percent | 99.5 | 99.5 | 99.5 | 99.5 |
| Mixed Liquor: |  |  |  |  |
| SS [1], p.p.m | 5,880 | 5,515 | 7,730 | 5,610 |
| MLVSS [2], p.p.m | 3,065 |  |  | 4,170 |
| MLVSS/SS | 0.52 |  |  | 0.74 |
| SVI [3] to clarifier |  | 47.5 | 54.2 | 48.9 |
| Settling rate [4] to clarifier, ft./hr | 5.8 | 5.8 | 3.2 | 5.8 |
| DO in Stage 1, p.p.m | 3.7 | 2.1 | 0.6 | 0.4 |
| DO in Stage 2, p.p.m | 5.1 | 4.5 | 4.0 | 7.4 |
| DO in Stage 3, p.p.m | 6.7 | 6.6 | 7.0 | 11.3 |
| DO in Stage 4, p.p.m | 3.6 | 11.4 | 9.4 | 13.6 |
| Recycle Sludge: |  |  |  |  |
| Rate, g.p.m | 1.6 | 1.0 | 1.3 | 1.6 |
| SS, p.p.m |  | 42,949 | 46,766 | 41,379 |
| Effluent: |  |  |  |  |
| BOD, p.p.m | 28.8 | 35.8 |  | 10.2 |
| SS, p.p.m | 9 | 33 |  | 16 |
| Average food/Biomass, lb. BOD$_5$/day × lb., MLVSS | 0.65 | 0.38 | 0.27 | 0.28 |
| Solids residence time, min | 160 | 160 | 156 | 180 |
| Removal efficiency, percent BOD | 88.6 | 82.0 |  | 94.0 |
| Recycle sludge/feed, vol./vol | 0.17 | 0.11 | 0.13 | 0.19 |

[1] Total Suspended Solids.
[2] Volatile Suspended Solids.
[3] Sludge Volume Index.
[4] Unstirred samples. Slowly stirred (raked) samples settle at substantially higher rates.

Table II demonstrates that the instant method may be used to achieve high BOD removal efficiency from municipal waste (82.0–94.0%) with relatively low mixing times (156–180 minutes), high sludge initial settling rates (3.2–5.8 ft./hr.), and low sludge recycle rate (recycle/feed volume ratio of 0.11–0.19) at high MLSS levels (5500–7700 p.p.m.).

Tables I and II also demonstrate a preferred embodiment wherein the oxygenated liquor has an unstirred initial settling rate of at least 5 feet per hour and Mohlman sludge volume index (SVI) of no more than 60. These conditions have been found advantageous in providing a dense sludge.

Tables I and II also demonstrate a preferred embodiment for treating municipal sewage which is particularly suitable in offering the aforedescribed advantages, e.g. high solids concentration in the aeration zone and shorter solids residence time. In this embodiment the recycled sludge has 30,000 to 50,000 total suspended solids content, the feed gas comprises at least 90% oxygen (by volume) and the gas above the mixed liquor has oxygen partial pressure of at least 380 mm. Hg in the oxygenation zone. The oxygenated liquor has DO of at least 5 p.p.m. with the average food/sludge ratio for the liquor during the oxygen gas mixing being maintained at least at 0.25 pounds $BOD_5$/day × pound volatile suspended solids. The oxygenated liquor has the initial settling rate and Mohlman sludge volume index characteristics specified in the previous paragraph and the recycling sludge/municipal sewage volume ratio is 0.1 to 0.3.

Although preferred embodiments have been described in detail, it will be appreciated that other embodiments are contemplated only with modification of the disclosed features, as being within the scope of the invention.

What is claimed is:

1. In a method for treating BOD-containing waste water by aeration in contact with sludge characterized by a volatile suspended solids to total suspended solids ratio of at least 0.55, concentrating solids from the aeration and recycling concentrated solid to the aeration zone as said sludge, the improvement comprising: mixing BOD-containing waste water, sludge having 12,000 to 50,000 p.p.m. total suspended solids content and feed gas comprising at least 50% oxygen (by volume) in an oxygenation zone in sufficient relative quantities to provide mixed liquor of 4,000 to 12,000 p.p.m. total suspended solids content and gas above said mixed liquor having oxygen partial pressure of at least 300 mm. Hg in said oxygenation zone, and continuing said mixing for 20 to 180 minutes solids residence time to form oxygenated liquor having dissolved oxygen content (DO) of at least 3 p.p.m., with the average food/biomass ratio for said liquor during the oxygen gas mixing being maintained at least at 0.15 pounds $BOD_5$/day × pound volatile suspended solids; separating said oxygenated liquor into said sludge and clarified effluent; and recycling at least part of said sludge to said oxygenation zone at flow rate relative to said BOD-containing waste water such that the recycling sludge/BOD-containing waste water volume ratio is 0.1 to 0.5.

2. A method according to claim 1 in which said oxygenated liquor has an unstirred initial settling rate of at least 5 feet per hour and Mohlman sludge volume index (SVI) of no more than 60.

3. A method according to claim 1 in which said feed gas comprises at least 90% oxygen and the oxygenation gas above said mixed liquor has oxygen partial pressure of at least 380 mm. Hg.

4. A method according to claim 1 in which liquor is transferred through a multiplicity of zones for staged mixing with oxygen-containing gas in each zone such that the food content (BOD) of the liquor in a particular zone is higher than the liquor in the next oxygen mixing zone to which the first mentioned liquor is transferred, and the liquor discharged from the last zone is said liquor separated into said sludge and clarified effluent.

5. A method according to claim 4 in which unconsumed oxygen-containing gas is transferred through said multiplicity of zones for staged mixing with liquor in each zone such that the oxygen content (volume percent oxygen) of the gas above the liquor in a particular zone is higher than the corresponding gas in the next zone to which the first mentioned gas is transferred, and the gas flows concurrently with liquor from zone-to-zone.

6. A method according to claim 1 in which liquor is transferred through a multiplicity of zones for staged mixing with oxygen-containing gas in each zone such that the food content (BOD) of the liquor in a particular zone is higher than the liquor in the next oxygen mixing zone to which the first mentioned liquor is transferred, and supernatant liquid is separated from liquor discharged from an oxygen mixing zone and only the remaining solid is passed to the next oxygen mixing zone.

7. In a method for treating municipal sewage by aeration in contact with sludge, characterized by a volatile suspended solids to total suspended solids ratio of at least 0.55, concentrating solids from the aeration and recycling concentrated solid to the aeration zone as said sludge, the improvement comprising: mixing municipal sewage sludge having 30,000 to 50,000 p.p.m. total suspended solids content and feed gas comprising at least 90% oxygen (by volume) in an oxygenation zone in sufficient relative quantities to provide mixed liquor of 4,000 to 12,000 p.p.m. total suspended solids content and gas above said mixed liquor having oxygen partial pressure of at least 380 mm. Hg in said oxygenation zone, and continuing said mixing for 20 to 180 minutes solids residence time to form oxygenated liquor having dissolved oxygen content (DO) of at least 5 p.p.m., an unstirred initial settling rate of at least 5 feet per hour and Mohlman sludge volume index (SVI) of no more than 60 and with the average food/biomass ratio for said liquor during the oxygen gas mixing being maintained at least at 0.25 pounds $BOD_5$/day×pound volatile suspended solids; separating said oxygenated liquor into said sludge and clarified effluent; and recycling at least part of said sludge to said oxygenation zone at flow rate relative to said municipal sewage such that the recycling sludge/municipal sewage volume ratio is 0.1 to 0.3.

References Cited

UNITED STATES PATENTS

| | | | |
|---|---|---|---|
| 2,380,465 | 7/1945 | Proudman | 210—220X |
| 3,054,602 | 9/1962 | Proudman | 210—15X |
| 3,342,727 | 9/1967 | Bringle | 210—220X |
| 3,356,609 | 12/1967 | Bruemmer | 210—7 |
| 3,401,113 | 9/1968 | Pruessner et al. | 210—15X |
| 3,412,017 | 11/1968 | Abson et al. | 210—7 |

OTHER REFERENCES

Grant, S., et al., The Oxygen Requirements of the Activated Sludge Process, Sewage Works Journal, April 1930, vol. 2, pp. 228–244.

Weston, R. F., et al., Contact-Stabilization Activated Sludge Treatment for Pulp and Paper Mill Waste, Tappi, March 1962, vol. 45, No. 3, pp. 223–237.

Robbins, M. H., Jr., Use of Molecular Oxygen in Treating Semi-Chemical Pulp Mill Wastes, Proc. 16th Ind. Waste Conf., Purdue U., March 1962, pp. 304 and 308. (P.O.S.L.)

Pfeffer, J. T., et al., Oxygen-enriched Air for Biological Waste Treatment, Water and Sewage Works, vol. 112, October 1965, pp. 381–384. (Copy in GP. 176)

MICHAEL ROGERS, Primary Examiner

U.S. Cl. X.R.

210—15, 195, 221; 261—93